Jan. 10, 1950     L. F. DE SAUSSURE     2,494,472
DUMP TRAILER FOR SEMITRAILER TYPE VEHICLES
Filed Aug. 12, 1946     5 Sheets-Sheet 1
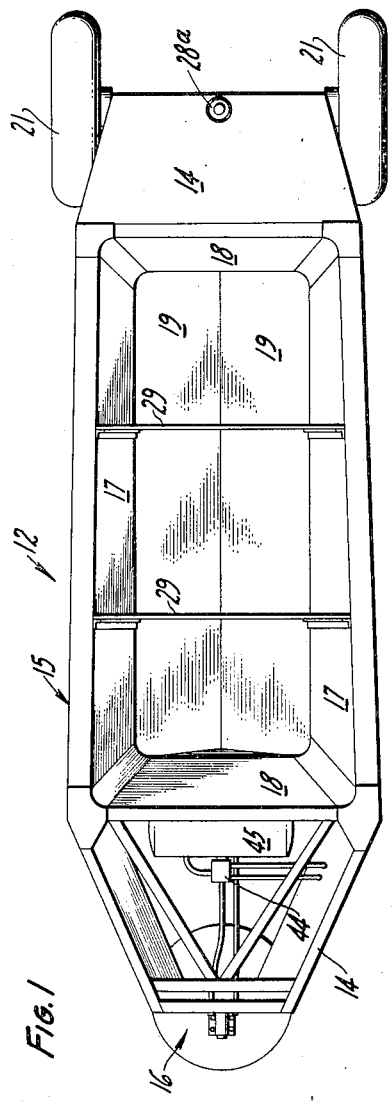
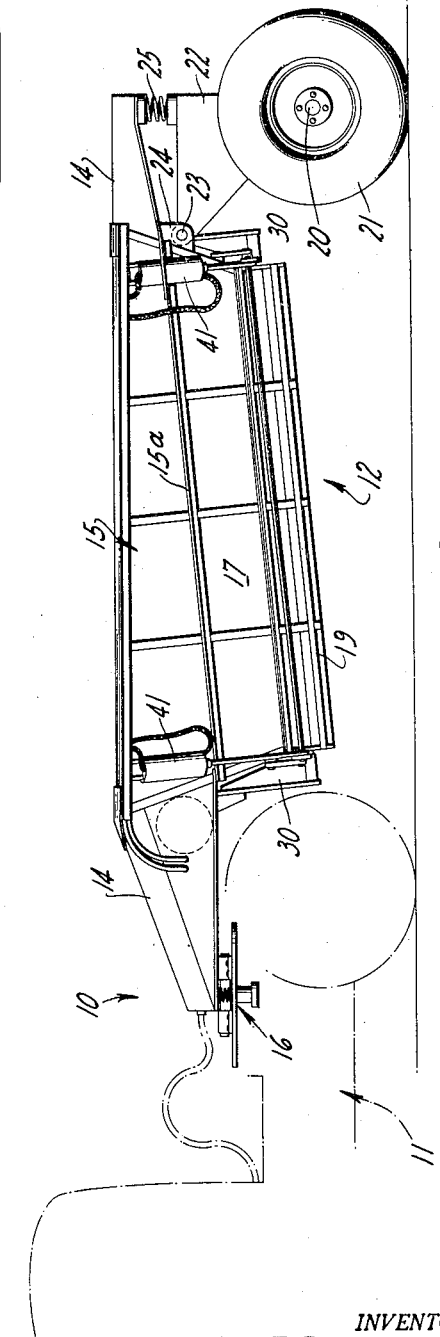
INVENTOR.
Leo F. DeSaussure
BY
Mellin & Hanscom
ATTORNEYS Jan. 10, 1950     L. F. DE SAUSSURE     2,494,472
DUMP TRAILER FOR SEMITRAILER TYPE VEHICLES
Filed Aug. 12, 1946     5 Sheets-Sheet 2
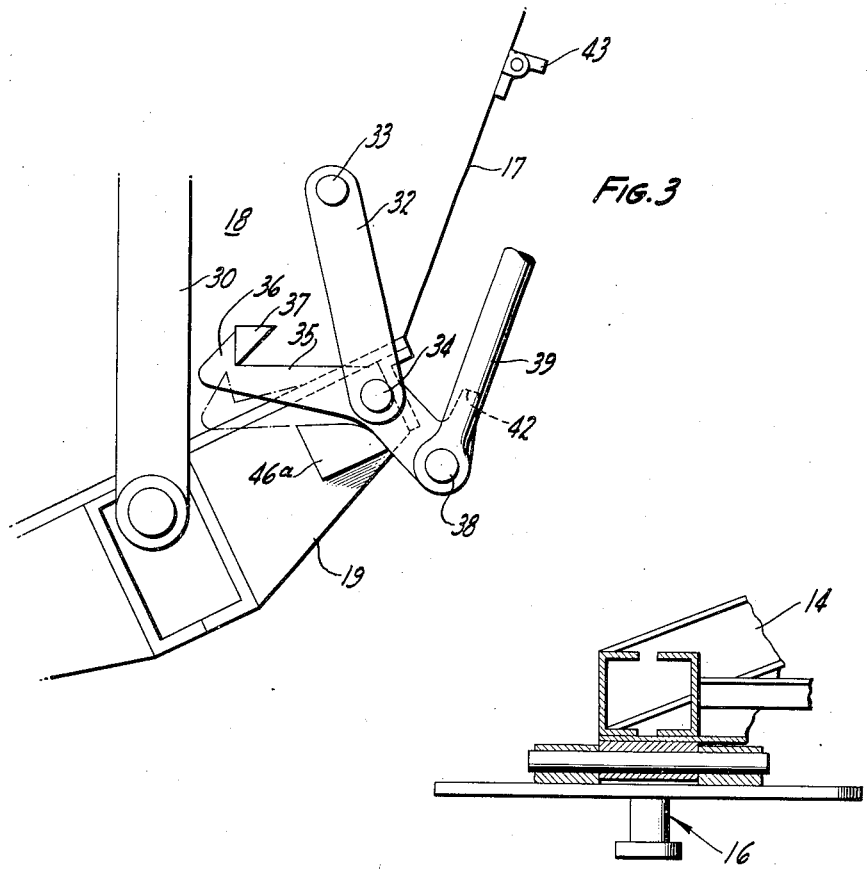
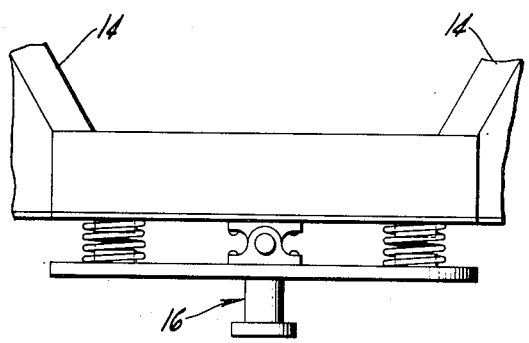
INVENTOR.
Leo F. DeSaussure
BY
Mellin & Hanscom
ATTORNEYS Jan. 10, 1950  L. F. DE SAUSSURE  2,494,472
DUMP TRAILER FOR SEMITRAILER TYPE VEHICLES
Filed Aug. 12, 1946  5 Sheets-Sheet 4

INVENTOR.
Leo F. DeSaussure
BY
Mellin & Hanscom
ATTORNEYS

Jan. 10, 1950   L. F. DE SAUSSURE   2,494,472
DUMP TRAILER FOR SEMITRAILER TYPE VEHICLES
Filed Aug. 12, 1946   5 Sheets-Sheet 5

INVENTOR.
Leo F. DeSaussure
BY
Mellin & Hanscom
ATTORNEYS

Patented Jan. 10, 1950

2,494,472

UNITED STATES PATENT OFFICE 2,494,472

DUMP TRAILER FOR SEMITRAILER TYPE VEHICLES

Leo F. De Saussure, Oakland, Calif.

Application August 12, 1946, Serial No. 689,853

8 Claims. (Cl. 298—31)

This invention relates to automative vehicles of the semi-trailer type.

It is the principal object of my present invention to provide an improved trailer structure for semi-trailer type of automative trucks, the body of which is equipped with an improved form of discharge gates and gate operating mechanism, insuring effective opening and closing of the gates under all conditions.

It is another object of my invention to provide an improved dump trailer of the character referred to which is fitted with an improved gate and gate operating mechanism, which operating mechanism may be actuated from a remote point to effectively control the operation of the gates.

It is another object of my invention to provide a dump trailer of the character referred to in which the body is fitted with an improved form of gate mechanism having associated therewith an improved latching and operating mechanism of simple and effective construction.

One form which the invention may assume is exemplified in the following description and illustrated by way of example in the accompanying drawings, in which:

Fig. 1 is a plan view of a dump trailer embodying the preferred form of my invention.

Fig. 2 is a side elevation of the dump trailer showing its association with the tractor.

Fig. 3 is an enlarged fragmentary view in end elevation showing the construction of the gate latch mechanism.

Fig. 4 is a fragmentary view in front elevation of the fifth wheel mechanism for connecting the trailer to the tractor.

Fig. 5 is a fragmentary view in longitudinal section through the fifth wheel mechanism for connecting the trailer to the tractor.

Figure 6:
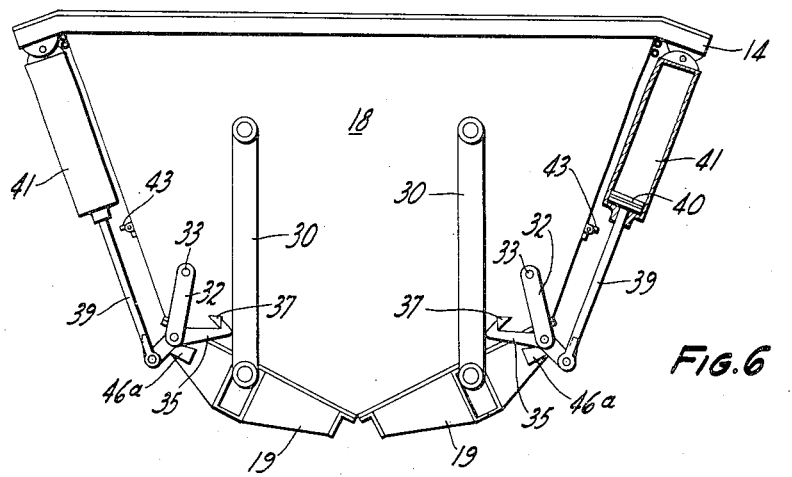
Figs. 6 and 7 are views in end elevation of the dump trailer body showing the manner of the operation of the body gates and showing the gates in both opened and closed positions.

Referring more particularly to the accompanying drawings, 10 indicates a semi-trailer type of dump truck comprising the usual tractor 11 and my improved form of dump trailer 12.

This vehicle is described and claimed in my co-pending application entitled "Automotive truck of semi-trailer type," filed August 12, 1946, Serial Number 689,852.

The dump trailer 12 comprises a main frame 14 which is disposed in a substantially horizontal plane and extends longitudinally of the trailer. Suspended from this main frame 14 but integrally connected therewith is the trailer bed or body 15, the ends of which, however, terminate short of the ends of the frame 14, as illustrated. The forward end of the main frame 14 inclines downwardly at a slight angle to provide a mounting for a fifth wheel mechanism 16, by means of which the trailer 12 may be connected to the tractor 11 in conventional semi-trailer fashion.

The construction of the fifth wheel which I utilize is illustrated in detail in Fig. 5. However, inasmuch as this particular type of fifth wheel connection between the trailer and the tractor is not part of my present invention, it will not be further illustrated and described. It will suffice to say that it constitutes a detachable swivel connection between the forward terminal of the frame 14 and the tractor 11.

The trailer 12 is provided with a sub-frame 15a, the forward terminal of which projects forwardly and is joined with the main frame 14, as illustrated in the drawings. The rear terminal of the sub-frame 15a extends rearwardly and is rigidly connected with the rear terminal of the main frame 14.

The body 15 comprises downwardly extending and slightly inwardly converging side walls 17. The bottom edges of the side walls lie in the same transverse plane and are vertically inclined longitudinally with respect to the main frame 14. The bottom side edges of the side walls 17 incline downwardly and forwardly so that the trailer bed 15 has a greater depth at its forward end than at its rearmost end. This, as will be described, is for the load distribution purposes.

At opposite ends the side walls 17 of the body 15 are rigidly joined by vertical end plates 18, which likewise converge inwardly slightly so that material contained within the body 15 will discharge freely downwardly through the bottom of the body 15 when the bottom of the same is open.

Fitting the open bottom of the body 15 and complementary thereto are two similar closure gates 19. These gates 19 are complementary and when in closed position form a complete closure for the bottom of the body 15. When the gates 19 are in closed position, their upper surfaces are slightly oppositely inclined to the horizontal with their meeting edges lowermost and disposed along the longitudinal center line of the body 15. The gates 19 are operative in order that they may be positioned to form a closure for the bottom of the body 15 or moved to an open or unobstructing position so that the material contained within the body 15 may discharge through the open bottom of the body 15.

Disposed rearwardly of the body 15 and underlying the rear terminal of the main frame 14 is an inverted U-shaped wheel-carrying carriage 22. At the opposite sides of the carriage 22 and exteriorly of each leg thereof are transversely aligned wheels 21 connected by stub axles 20 to the legs of the carriage 22. The top of the carriage 22 extends forwardly with respect to the trailer and is pivotally connected at opposite sides to brackets 24 fixed to the sub-frame 15a by aligned pivot pins 23 forming a pivotal connection between the carriage 22 and the sub-frame 15a which enables the carriage 22 to oscillate in a vertical plane. The pivotal axis of the carriage 22 is parallel to the axes of the wheels 21 and disposed both forwardly and above the same, as illustrated in Fig. 2.

Figure 8:
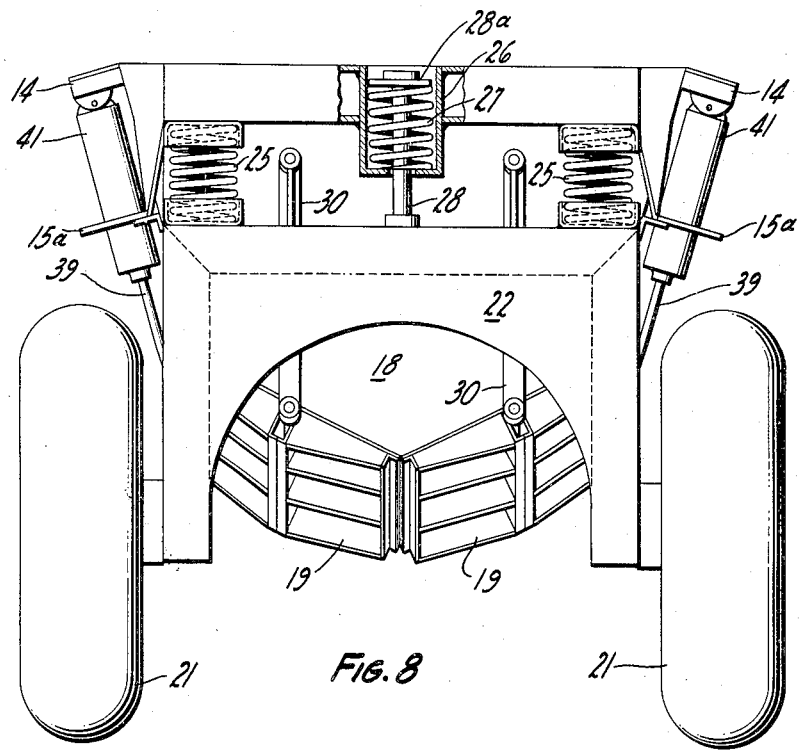
Fig. 8 is a view in rear elevation of the trailer with parts broken away and in section to more fully disclose certain details of construction.

At the rearmost end of the carriage 22 are coil-type, load-sustaining springs 25 which are vertically aligned with the wheel axes and interposed between the underside of the main frame 14 and the top of the carriage 22. These springs 25 are, of course, as illustrated in Fig. 8, located at opposite sides of the longitudinal center of the carriage 22 and main frame 14. Centrally between the springs 25 in transverse alignment therewith, the frame 14 is provided with a socket 26 in which is disposed a snubbing coil spring 27. A pintle 28 is fastened to the carriage 22, projects through the spring 27 and is collared thereabove by a collar 28a so as to effect snubbing of the reaction of the springs 25.

For the purpose of stiffening the body 15 and preventing bulging or other misalignment of the sides 18 thereof, I provide two stiffening partitions 29 which extend transversely between the side walls and are secured thereto as illustrated in Fig. 1. The contour of these partitions at their bottom conforms to the bottom of the end plates 18, as illustrated in Fig. 6.

Thus, it is seen that I have provided a trailer having a longitudinal, rigid frame structure defining its upper boundary and suspended from which frame structure is a dump-type carrying body, the ends of which extend short of the forward and rear ends of the frame structure, and which is so contoured that a load carried in the body will be substantially equally distributed at both ends thereof so that the rear wheels 21 of the trailer suspended below the rearmost terminal of the body 15 and the rear wheels of the tractor, which will be arranged rearwardly of the fifth wheel connection 16 between the trailer and tractor, will substantially equally bear the load of the trailer.

By this construction, the center of gravity of the trailer will be extremely low while still providing ample clearance for dumping purposes, as will be described.

To discharge or dump the load of the trailer, the gates 19 are pivotally suspended from the trailer body in a novel and efficient manner so that the weight of the material within the body 15 will act to move the gates 19 to open position. Also, this pivotal suspension of the gates causes the gates, after the load has been discharged and the thrust of the load is removed therefrom, to tend to return automatically to closed position through force of gravity.

Figure 7:
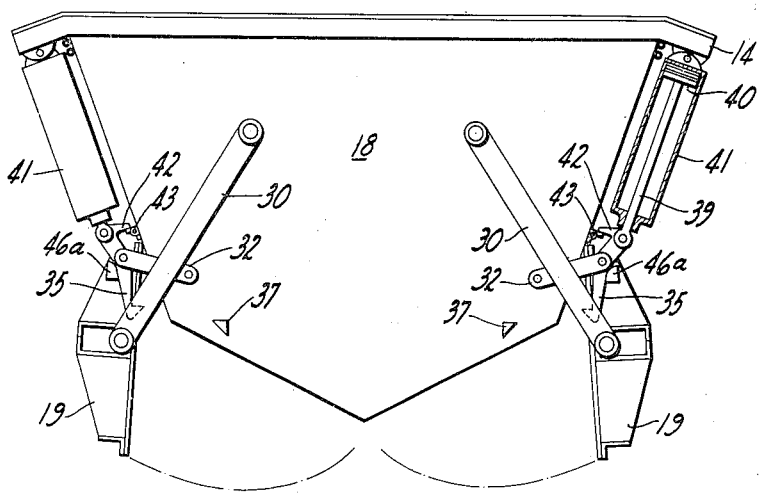

The pivotal suspension of each gate 19 is identical and, therefore, but one thereof will be described. Reference being had to Figs. 3, 6 and 7, it will be seen that at the end of each gate it is pivotally connected to a gate suspension lever 30 which is pivoted at its upper end to the end plate 18 of the body 15. The pivotal connection between the lower end of the suspension lever 30 and the gate 19 is midway between the sides of the gate, and its axis is parallel to the longitudinal center of the body 15. A secondary suspension lever 32 is also provided at each gate end, which lever 32 is pivoted at its upper end as at 33 to the end plate 18 of the body or bed 15, and at its lower end it is pivoted to the end of the gate adjacent the exterior marginal edge thereof. The pivotal axes of the levers 30 and 32 are, of course, in parallelism.

The pivotal connection between the link or lever 32 and the gate 19 is accomplished by means of a longitudinal latch shaft 34 rotatably carried by the gate 19. Secured on this shaft 34 at each end thereof is a latch lever 35 in the form of a modified bell crank. One end of this latch lever 35 has a keeper 36 to cooperate with a keeper lug 37 fixed to the end plate 18 of the body 15. The opposite end of the lever 35 is pivotally connected as at 38 to the piston rod 39 of a piston 40 of an air or vacuum cylinder 41. Projecting from this latter end of the lever 35 is a latching dog 42 to cooperate with a hinged latch member 43 mounted on the adjacent side 17 of the body 15.

When the gate 19 is in closed position, the keeper 36 engages the keeper lug 37 and latches the gate 19 in such position. At this time it will be seen from Fig. 6 that the gate suspension lever 30 is in almost a truly perpendicular position. The inclination of the inner face of the gate is such that the pressure of the load thereon will tend to swing the gate outwardly to the position shown in Fig. 7 in order that the load may discharge. The gate is, of course, latched against this outward movement by the engagement of the keeper 36 with the keeper lug 37.

To effect unlatching of the gate 19 is the function of the piston 40 and its piston rod 39. The cylinders 41 are connected through suitable conduit to a control valve 44 on the trailer associated with a pressure accumulator or vacuum tank 45 also on the trailer. The valve 44 is operatively connected to a remote point accessible to the driver of the tractor 11 so that when the driver desires to dump the load in the trailer body 15, he manipulates the control, operates the valve 44 which injects air under pressure or creates a vacuum in the proper end of the cylinder 41, moving the piston 40 toward the opposite end of the cylinder 41. This movement of course disengages the keeper 36 from the keeper lug 37 and causes the gates 19 to swing the same outwardly to the position shown in Fig. 7.

Should the weight of the load be insufficient to operate the gates 19 by swinging them to an outward position, the action of the force exerted on the piston 40 will cause the latter through the piston rod 39 and the bell crank lever 35 to swing the gate 19 to open position, as is clearly illustrated in the drawings.

When the gate reaches wide open position, the latch lug 42 will pass by the latch member 43 due to the fact that the latter may pivot upwardly, and when wide open position is reached the latch lug 42 may engage the top side of the latch member 43 and effect latching of the gate 19 in open position. This latching is sufficient to overcome the tendency of the force of gravity to swing the gate to closed position and thus maintain it in open position until the load has been completely discharged.

When desiring to close the gates 19, the operation of the valve 44 is reversed to move the piston 40 in the opposite direction, forcing the piston rod 39 downwardly.

In that the upper end of the cylinder 41 is pivotally connected to the frame 14 of the body when the piston tends to move in a downward direction, the engagement of the latch lug 42 with the latch member 43 will cause the lower end of the cylinder 41 to spring outwardly from the body 15 sufficiently to enable the latch lug 42 to become out of register with the latch member 43 so that the gate 19 may swing back to closed position.

From the drawings it is obvious that the gate 19, as soon as the latch lug 42 disengages from the latch member 43, will tend to swing as a pendulum about the pivotal connection between the suspension lever 30 and the body 15 to closed position. In this position, the lever 30 will assume a truly vertical position, while the gate 19 will assume a closed position, being pivoted about the lower end of the lever 30 by the connection between the lever 32 and the body and the gate.

This closing action is augmented by the downward action of the piston 40 under the influence of air pressure at the correct side thereof. It is obvious that either air under pressure or vacuum may be employed to actuate the pistons 40. Both of these methods of actuating a piston in road vehicles of the character herein disclosed is conventional and, therefore, need not be described in detail.

Stop members 46a on the gates 19 limit the swinging or pivotal movement of the latch levers 35 in both directions for obvious reasons.

Figure 9:
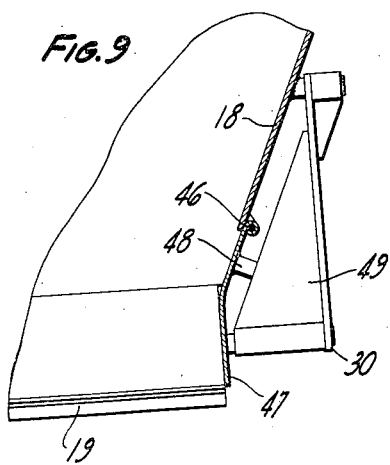
Fig. 9 is a fragmentary view in transverse section showing a slightly modified form of construction for the rearmost end of the trailer body.
Figure 10:
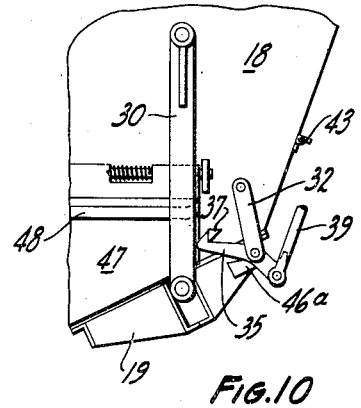
Fig. 10 is a fragmentary view in end elevation showing such modified construction.

I desire to point out that if considered necessary or desirable, the lower terminal of the rear plate 18 of the body 15 may have a hinged lower section 47, as illustrated in Fig. 9. The hinge is indicated by the numeral 46 and it extends transversely of the body 15 as shown. The hinge 46 is such that the pivotal section 47 of the end plate 18 may swing rearwardly and upwardly so as to pass over any material which has previously been dumped from the body.

To maintain this section 47 of the rear plate 18 in proper closed position relative to the end plate 18 when the gates are closed, I provide a pair of complementary cam plates 48 and 49, the one 48 being on the hinge section 47 and the one 49 being on the adjacent gate suspension lever 30. When the gates 19 are swung to open position, as illustrated in Fig. 7, the cam 49 disengages from the cam 48 allowing pivotal movement of the section 47. However, when the gates 19 are swung to closed position, the cams 49 engage the cams 48, as illustrated in Fig. 9, moving and maintaining the hinge section 47 of the end plate 18 in closed position.

Figure 11:
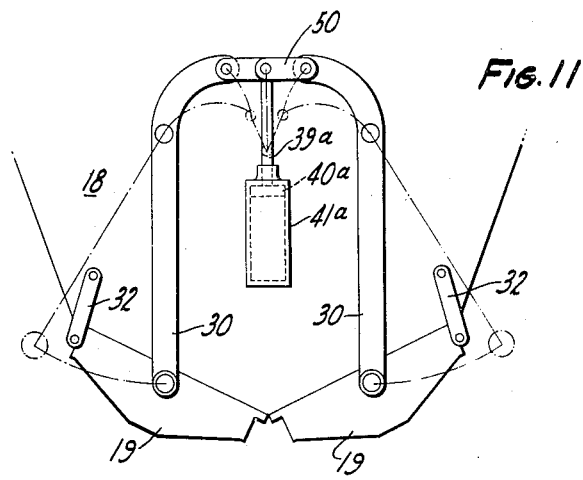
Fig. 11 is a fragmentary view in end elevation showing a modified form of operating mechanism for operating the body gates.
Figure 12:
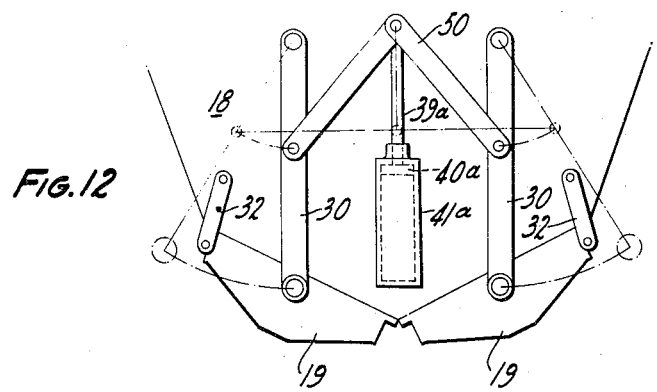
Fig. 12 is a fragmentary view in end elevation of the trailer body showing a further modified form of gate operating mechanism.
Figure 13:
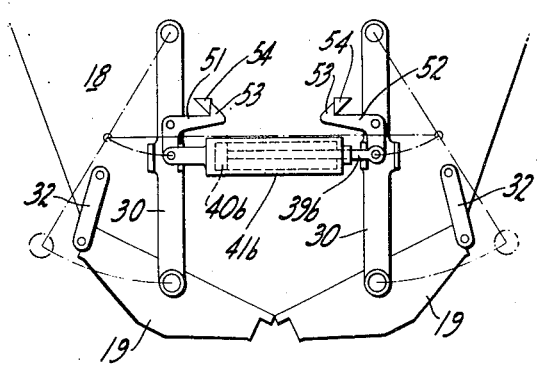
Fig. 13 is a fragmentary view in end elevation showing a still further modified form of mechanism for use in operating the dump trailer body gates.

In Figs. 11, 12 and 13 I have shown modified forms of apparatus to operate the gates by air pressure or by vacuum. In all three of the forms shown in Figs. 11 to 13, inclusive, the gates 19 are suspended, as previously described, by means of the levers 30 and 32. However, in the form shown in Fig. 11, a single cylinder 41a is provided, the piston rod 39a of which is connected through link mechanism 50 directly to the upper ends of the levers 30 so that reciprocation of the piston 40a in the cylinder 41a will cause swinging movement of the levers 30 in opening and closing directions. Obviously, as illustrated in Fig. 11, when the link mechanism 50 is moved past dead center, a latching effect will be created to latch the gates in open position, necessitating the application of force on the piston 40a to move the linkage from past dead center to the point where the force of gravity will assist the operation of the piston 40a in swinging the gates to closed position.

A somewhat similar mechanism is illustrated in Fig. 12 with the exception that the link mechanism is of a slightly different character. The operation, however, of the device shown in Fig. 12 is obvious from the drawings.

In Fig. 13 one end of the cylinder is connected to a bell crank latch member 51 and the piston rod 39b is similarly connected to a similar bell crank latch lever 52. The latch levers 51 and 52 have keepers 53 to engage keeper lugs 54 on the end plate 18 of the body. When the piston 40b is caused to move in the cylinder 41b in a direction tending to enlarge the distance between the connection of the cylinder and the lever 51 and the piston rod 39b and the lever 52, the levers will be oppositely swung to disengage from the latch lugs 54 and the levers 30 will be oppositely and outwardly swung as indicated in dotted lines to move the gates 19 to open position. On reverse movement of the piston 40b under the influence of either air pressure or vacuum in the cylinder 41b, the levers 30 will be swung toward each other to swing the gates 19 to closed position and to swing the latch levers 52 in a direction re-engaging the lugs 54 to latch the gates in closed position.

It is seen that in that the top of the trailer is parallel to the ground there will be no obstruction to loading. The low height of the trailer likewise will be of aid to loading.

It is also apparent that in spite of the low center of gravity of the trailer when loaded there will be sufficient clearance when moving the trailer from a dumped load.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a vehicle of the character described, a body having sides and ends, a pair of complemental gates to form a closure for the bottom of the body, a pair of aligned pendulum levers for each gate, said levers being connected at their lower ends to the gates substantially midway between the sides of the gates, said levers being connected at their upper ends to the body at a point substantially vertically overlying the pivotal points of connection of their lower ends with the gates when the gates are in closed position, a pair of aligned link levers for each gate pivoted at their lower ends to the gate adjacent the outer side thereof and at their upper ends to the body above the gate and inwardly of the body relative to their pivotal point of connection with the gate, the pivotal axes of said link levers and said pendulum levers being in parallelism.

2. In a vehicle of the character described, a body having sides and ends, a pair of complemental gates to form a closure for the bottom of the body, a pair of aligned pendulum levers for each gate, said levers being connected at their lower ends to the gates substantially midway between the sides of the gates, said levers being connected at their upper ends to the body at a point substantially vertically overlying the pivotal points of connection of their lower ends with the gates when the gates are in closed position, a pair of aligned link levers for each gate pivoted at their lower ends to the gate adjacent the outer side thereof and at their upper ends to the body above the gate and inwardly of the body relative to their pivotal point of connection with the gate, the pivotal axes of said link levers and said pendulum levers being in parallelism, latch means for latching said gates in closed position, actuating means for actuating the latch means and for urging said gates to open and closed position, said actuating means including cylinders having double-acting pistons therein operatively connected to the latch means and to the gates.

3. In a dump truck or the like adapted to receive and retain a load and to dump the same, comprising side and end walls defining a body portion, and a bottom portion comprising two parallel gates suspended from the body portion and adapted to swing from a closed position supporting the load to an open position to dump the load, the improvement which comprises a pendulum support for each gate, each said pendulum support comprising a lever pivoted at its upper end to the body portion and at its lower end to the gate and so positioned with respect to said gate that the weight thereof when in open position urges the gate to closed position, and such that when in closed position the weight of a load urges the gate to open position.

4. The structure of claim 3, including a hinged connection of the outer edge of each gate to the body portion, comprising a link lever pivoted at one end to said body portion and at the opposite end to said gate.

5. The structure of claim 3, including auxiliary means for opening and closing the gates, comprising means operable by fluid pressure and operatively connected to said gates to swing the same from open to closed position and vice versa.

6. The structure of claim 5, wherein said auxiliary means comprises a pair of cylinders disposed on opposite sides of the body portion and each provided with a double acting piston and a piston rod, and each said gate is provided with a lever operatively connecting the gate with one of said piston rods, whereby reciprocating motion of said piston and piston rod actuates said lever to open and close said gate.

7. The structure of claim 5, wherein said auxiliary means comprises a cylinder provided with a double acting piston and a piston rod operatively connected to said pendulum supports, whereby movement of said piston and piston rod under fluid pressure augments the gravitational forces normally tending to open and close the gates.

8. The structure of claim 5, wherein said auxiliary means comprises a cylinder disposed transversely of and between said pendulum supports, and said cylinder is pivotally connected at one end to one of said supports and is provided with a double acting piston and a piston rod, the latter being pivotally connected to the other of said supports.

LEO F. DE SAUSSURE.

REFERENCES CITED

The following references are of record in the file of this patent:

UNITED STATES PATENTS

| Number | Name | Date |
|---|---|---|
| 894,128 | Focht | July 21, 1908 |
| 1,087,343 | Abbott | Feb. 17, 1914 |
| 1,166,400 | Cook | Dec. 28, 1915 |
| 2,233,193 | Armington et al. | Feb. 25, 1941 |
| 2,401,407 | Benbow et al. | June 4, 1946 |